(12) United States Patent
Sawaya

(10) Patent No.: US 6,581,265 B2
(45) Date of Patent: Jun. 24, 2003

(54) WHEEL PULLING APPARATUS

(76) Inventor: Eli Sawaya, 40 Heathcliffe Square, Brampton Ontario (CA), L6S 5P7

( * ) Notice: Subject to any disclaimer, the term of this patent is extended or adjusted under 35 U.S.C. 154(b) by 0 days.

(21) Appl. No.: 09/938,568

(22) Filed: Aug. 27, 2001

(65) Prior Publication Data
US 2003/0037425 A1 Feb. 27, 2003

(51) Int. Cl.[7] .................................................. B23P 19/00
(52) U.S. Cl. ...................... 29/426.5; 405/184; 405/154; 405/156; 405/42; 29/239; 29/402.3; 29/261; 29/258
(58) Field of Search .............................. 29/426.5, 239, 29/261, 253, 262, 258, 259, 263, 264, 282, 402.03, 426.1, 244, 245, 256, 267; 405/184, 154, 154.1, 156, 174, 42, 303

(56) References Cited

U.S. PATENT DOCUMENTS

| | | | |
|---|---|---|---|
| 2,296,119 A | * 9/1942 | Ringrose | ..................... 29/262 |
| 3,402,455 A | 9/1968 | Converse | |
| 3,689,978 A | 9/1972 | Kelso | |
| 4,057,889 A | * 11/1977 | Ferguson | ..................... 29/426.5 |
| 4,649,615 A | * 3/1987 | Hundley | ..................... 29/261 |
| 4,771,528 A | 9/1988 | Stromberg | |
| 4,786,214 A | * 11/1988 | Schmidt et al. | .............. 405/303 |
| 4,908,925 A | 3/1990 | Johnson | |
| 6,012,211 A | 1/2000 | Ochoa et al. | |
| 6,237,206 B1 | 5/2001 | Bezemer et al. | |
| 6,299,382 B1 | * 10/2001 | Wentworth | .................. 405/184 |

FOREIGN PATENT DOCUMENTS

| | | | |
|---|---|---|---|
| DE | 3515657 | * | 11/1985 |
| DE | 19844508 A1 | | 8/1999 |
| DE | 19844508 | * | 8/1999 |

* cited by examiner

Primary Examiner—Gregory Vidovich
Assistant Examiner—Stephen Kenny
(74) Attorney, Agent, or Firm—Marks & Clerk

(57) ABSTRACT

An apparatus for the repair or maintenance of a vehicle is provided which facilitates the removal of a wheel, wheel rim, brake rotor, brake drum or the like, when these become seized or fused onto the wheel hub of the vehicle. The wheel pulling apparatus provides a pull plate to pull on, for example, a brake drum, and a push plate which acts to directly or indirectly push on the wheel studs of the vehicle. A simple, easy to use wheel pulling apparatus is provided.

19 Claims, 6 Drawing Sheets

WHEEL PULLING APPARATUS

FIELD OF THE INVENTION

The present invention relates to the field of vehicle repair and maintenance, and in particular, relates to a device for the removal of wheels, brake drums, brake rotors, and the like, from a vehicle.

BACKGROUND OF THE INVENTION

During the repair or maintenance of a vehicle, including trucks, automobiles and the like, it is frequently necessary to remove the wheels, brake rotors and/or brake drums. However, the tolerances between these devices is very small. For example, the clearance between the inner wheel rim and the wheel hub are typically on the order of only several thousands of an inch. Similarly, the clearance between a brake drum or brake rotor and the wheel hub is also very small. Because of these small tolerances and because the wheel hub assembly bears the weight of the vehicle, extended use of the vehicle can frequently cause the inner wheel rim, the brake drum, or the brake rotor, to become essentially fused or seized on the wheel hub.

Once a wheel, for example, is seized on the wheel hub, it can be very difficult to remove the wheel from the vehicle by hand. The common practice in the vehicle repair industry is to have a mechanic hoist the vehicle and hammer on the seized wheel, from the inside, until the wheel becomes loose enough to remove.

This method can, however, cause damage to the rim, the brake drum, the brake rotor, or other parts of the vehicle during hammering. Further, this operation can take an unacceptable amount of time to release the seized part. Yet further, the safety of the mechanic can be jeopardized when hammering a wheel part while under the vehicle.

Still further, if the vehicle should need repair while traveling, such as for example, caused by having a flat tire, it can often be excessively difficult to remove the seized part by hand. Further, hammering of the part with a heavy object is not generally an acceptable option because of the limited space under the vehicle created by lifting the vehicle with a small manual vehicle jack.

In order to address these problems, the prior art provides for a number of different devices to assist in this type of vehicle repair, and to assist in removal of a wheel, a brake rotor, a brake drum, or the like, from a vehicle. These devices may generally be described as "wheel-pulling" apparatuses, even though they can also be used for removal of brake drums or brake rotors, in addition to the removal of wheels or wheel rims, from the vehicle.

Some of these known prior art devices are described hereinbelow.

PRIOR ART

In U.S. Pat. No. 3,402,455 (Converse), issued Apr. 17, 1967, a wheel puller device is described having a central threaded screw which pushes on the hub (or axle) of the vehicle wheel, while two spring-loaded hooks grasp and pull at the rear of the wheel or brake drum to be removed.

In U.S. Pat. No. 3,689,978 (Kelso), issued Sep. 12, 1972, a similar wheel or gear puller device is shown having a central threaded screw which pushes on the hub of the vehicle wheel or gear. Two hooks are attached in the radial grooves of a central yoke or bridge so that the hooks can be moved to be essentially parallel to the central threaded screw during use.

U.S. Pat. No. 4,771,528 (Stromberg), issued Sep. 20, 1988, describes a spindle puller for removal of the front wheel spindle on a four-wheel drive vehicle. Again, the described spindle puller has a central threaded screw which pushes on the axle, while a base plate acts to pull on the spindle. It should be noted that the user is warned not to hammer on the threaded screw, since internal axle parts may be damaged.

U.S. Pat. No. 4,908,925 (Johnson), issued Mar. 20, 1990, describes a wheel hub puller which is used to remove the wheel hub from a axle housing. Again, a central threaded screw acts to push on the axle, while a support frame, bolted to the wheel hub using the wheel lugs (and bolts) acts to pull on the wheel hub.

U.S. Pat. No. 6,012,211 (Ochoa et al.), issued Jan. 11, 2000, describes a wheel puller apparatus having a plate which rests upon the wheel mounting studs, and having two threaded hook portions which extend through the plate and hook onto the rear of the wheel. As bolts are tightened on the threaded hooks, the plate pushes against the wheel mounting studs, while the hooks pull on the wheel rim. The two hooks are alternatively "pulled" so that the pushing and pulling forces are first applied on one side of the wheel and then applied on the opposite side of the wheel. This results in a rocking motion which can result in damage to the wheel or brake assembly due to the side-to-side motion of the wheel as it is being freed.

U.S. Pat. No. 6,237,206 (Bezemer et al.), issued May 29, 2001, describes a device for removal of a wheel from a wheel hub, having a threaded screw connected to a retainer through a base plate, which threaded screw is engaged with the wheel hub, and a series of chains with hooks for releasably attaching the base plate to the wheel. As the treaded screw is tightened, the retainer pushes on the retainer, while the chains act to pull on the wheel rim.

While these devices have shown some utility in the field, they are primarily intended for use on trucks and heavy duty equipment in a garage environment, or they are intended for use with wheels that are hub-mounted, as opposed to being stud-mounted, on the vehicle.

Accordingly, while these prior art devices have proven to be of some use, the continued mechanic's practice of hammering seized parts is evidence that a further improvement in wheel-pulling apparatuses would be beneficial.

SUMMARY OF THE INVENTION

Accordingly, it is a principal object of the present invention to provide a simple wheel-pulling device which can be readily used on a wide variety of vehicle types for removal of wheels, brake rotors and/or brake drums.

It is a further object of the present invention to provide a wheel-pulling device which acts to avoid exerting a pushing force directly on the axle or hub of the vehicle.

It is still a further object of the present invention to provide a wheel-pulling device which acts while avoiding a damaging rocking, or side-to-side-motion.

These and other objects are attained by providing a wheel-pulling device having a push plate which acts to push upon the mounting studs of a wheel, hook members to pull on the wheel, brake rotor or brake drum, a pull plate to which the hook members are attached, and a threaded pilot shaft which is threaded through the pull plate so that when tightened, the pilot shaft acts to push against the push plate (which in turn acts to push against the wheel studs), and pulls the hook members so as to pull the wheel rim.

Accordingly, the present invention provides a wheel-pulling apparatus comprising:

a. a push plate adapted to be placed in operative contact with a plurality of wheel studs;
b. a pull plate having two or more hook attachment points;
c. two or more hook members adapted to be attached, at a first end, to said pull plate at said hook attachment points, and which hook members are adapted to connect, at a hook end, to a wheel rim, a brake drum or a brake rotor; and
d. a threaded pilot shaft which threads through a threaded opening in said pull plate, and abuts, at a proximate end, against said push plate, and which pilot shaft has, at a distal end, a turning mechanism for turning said threaded pilot shaft within the threaded opening in said pull plate, so that said push plate exerts a pushing force on said wheel studs, and said pull plate exerts a pulling force on said wheel rim, brake drum or brake rotor, through said hook members.

Preferably, the wheel-pulling apparatus also provides a plurality of socket pins adapted to being attached to said plurality of wheel studs, wherein said socket pins are in contact with said push plate.

In a second aspect, the present invention also provides a method for the removal of a brake drum a wheel, or a brake rotor using an apparatus of the present invention as herein described.

DETAILED DESCRIPTION OF THE INVENTION

In the context of the present specification, the phrase "wheel studs" is intended to mean the bolt ends which typically extend from the wheel hub on which the wheel, brake rotor, brake drum, or the like, are mounted. The "wheel studs" normally remain on the vehicle after the wheel has been removed. However, the phrase is also meant to include a series of bolts which might be inserted into the wheel stud openings on the hub in the situation where the actual studs are removed when the wheel is removed. The number of wheel studs can vary from vehicle to vehicle, but typically, the number of wheel studs ranges from between 3 and 8, but more typically is between 4 and 6.

In the practice of the present invention, it is preferred that the push plate exert a simultaneous pushing force against a plurality of wheel studs, and more preferably a simultaneous pushing force against all of the wheel studs (or socket pins, where used). The phrase "simultaneous pushing, force" is intended to mean that the push plate generally acts on more than one wheel stud, and preferably on all wheel studs (or socket pins), as the turning mechanism is turned.

Preferably, the push plate has a central recess on one surface for receiving one end of the pilot shaft. Where the pilot shaft has a small diameter section at the end, the recess in the push plate may also be a hole through the push plate, provided that the diameter of the hole is less than the larger diameter section of the pilot shaft.

The push plate also preferably comprises a number of holes or recesses on a second surface into which the wheel studs of the socket pins can be inserted. Again, where the socket pins have a small diameter section at the end, the recess in the push plate may be a suitably sized hole. The number of holes or recesses, and sizes of the holes or recess will preferably match, or be selected based on the number and size of the wheel studs or the socket pins.

The recess in second surface of the push plate might also be a circular groove in which all of the wheel studs or socket pins will fit.

The push plate is preferably circular in shape to agree with the shape of the wheel rim, brake drum or brake rotor, although a variety of shapes might be used. Preferably the push plate is of a size to cover all of the wheel studs, but should not be significantly larger to avoid interference with the hook members unless allowances are made for the hook members to avoid interference with the push plate.

The term "hook members", or "hooks" is used in a general sense to include devices which have a traditional hook-shaped design. However, the term can also cover a series of designs, including, for example, an L-shaped design which can be used for situations where the clearance distance between parts is relatively small. Further, the term hook may also be interpreted as a device which merely contains a small "shoulder" area which can be used to exert a pulling force on the wheel, the wheel drum or brake rotor.

The hooks are preferably attached to the pull plate at a hook attachment point using one or more bolts at a threaded end of the hook. Preferably, between 3 and 8 hook members are used in the practice of the present invention, and more preferably, between 4 and 6 hook members are used.

A pull plate may comprise a number of hook attachment points regardless of the number of hooks being used. The number, size and location of the hook attachment points will vary depending on the size of the hooks and the configuration of the wheel rim, brake drum or brake rotor. The hook attachment points might be threaded holes into which the threaded end of the hook could be tightened, or could simply be holes through which the threaded end of the hook could be passed and then held in place by an additional bolt.

The pull plate can have a wide variety of shapes and sizes. For example, the pull plate might be circular in shape and be provided with a series of threaded holes into which the hook members might be threaded. However, in a preferred configuration, the pull plate comprises a small central portion having a threaded central hole for the pilot shaft to pass through, and a plurality of radial arms extending from the central portion, to which the hook members can be attached. The number of radial arms should preferably agree with the number of hooks to be used. Preferably the number of radial arms would be between 3 and 8 and more preferably, between 4 and 6.

In a preferred embodiment, the pull plate will have a small central portion and a plurality of radial arms each having a slot into which the threaded end of the hook member can be inserted and adjusted before being tightened into place.

The pilot shaft is of sufficient length to pass through the pull plate and abut against the push plate. The pilot shaft is threaded in the area of where it passes through the pull plate, and thus is threaded into the threaded hole in the centre of the cental portion of the pull plate.

At one end, the pilot shaft preferably has a bolt shaped head onto which a wrench or a wrench-shaped crank can be attached, and thus provides a turning mechanism for turning the pilot shaft. Alternatively, the crank can be formed as part of the pilot shaft so that no additional crank or wrench, or the like, is required.

All parts of the apparatus of the present invention are preferably made of materials which are able to withstand the forces exerted during operation. A suitable material would be, for example, steel, for most applications.

BRIEF DESCRIPTION OF THE DRAWINGS

Various embodiments of the wheel pulling apparatus of the present invention will now be described by reference to the following drawings wherein.

DETAILED DESCRIPTION OF THE PREFERRED EMBODIMENTS

Figure 1:
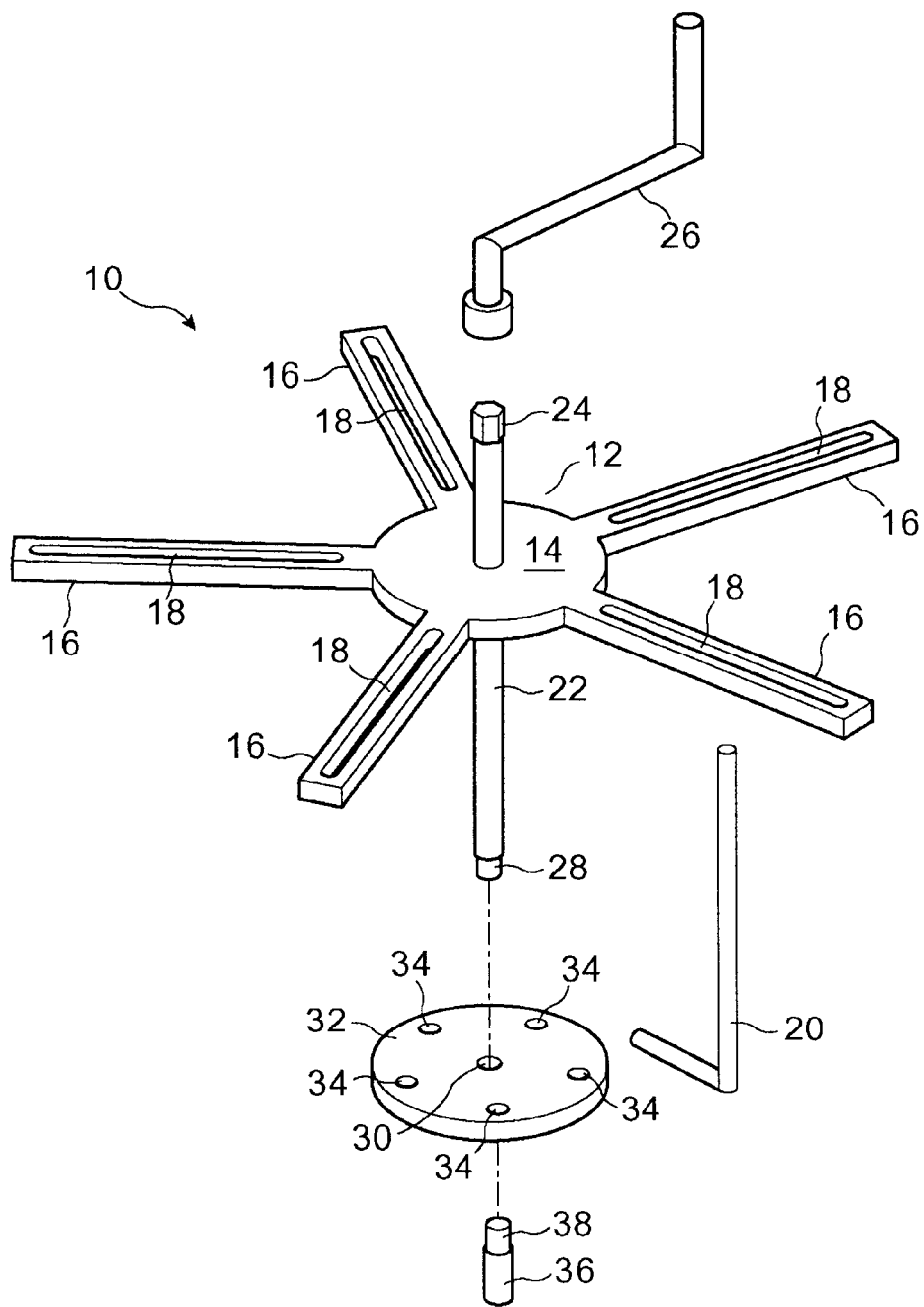
FIG. 1 is a perspective, exploded view of a wheel pulling apparatus according to the present invention.

Other features of the present invention, as well as other objects and advantages attendant thereto, are set forth in the following description and the accompanying drawings in which like reference numerals depict like elements.

In FIG. 1, a wheel pulling apparatus 10 in accordance with the present invention is shown having a pull plate 12, which in this embodiment has a central portion 14 and five radial arms 16. Each radial arm has a slot 18 through which, preferably 5 hooks 20 can be fed. Slots 18 allow hooks 20 to be positioned in a suitable position as described hereinbelow.

Extending through the centre of cental portion 14 of pull plate 12 is a pilot shaft 22 which is threaded in at least the area in contact with pull plate 12. Pull plate 12 is also treaded in this area to receive the threaded section of pilot shaft 22. At one end, pilot shaft 22 has a bolt shaped end 24 which can be releasably attached to a wrench or to a crank 26. Crank 26 can then be used to turn pilot shaft 22.

At the other end of pilot shaft 22 is a tapered, or smaller diameter end 28 which is adapted to fit into a recess 30 in push plate 32. Push plate 32 also contains, in this embodiment, 5 holes 34 into which the tapered, or smaller diameter ends 38 of socket pins 36 can be fitted.

Figure 2:
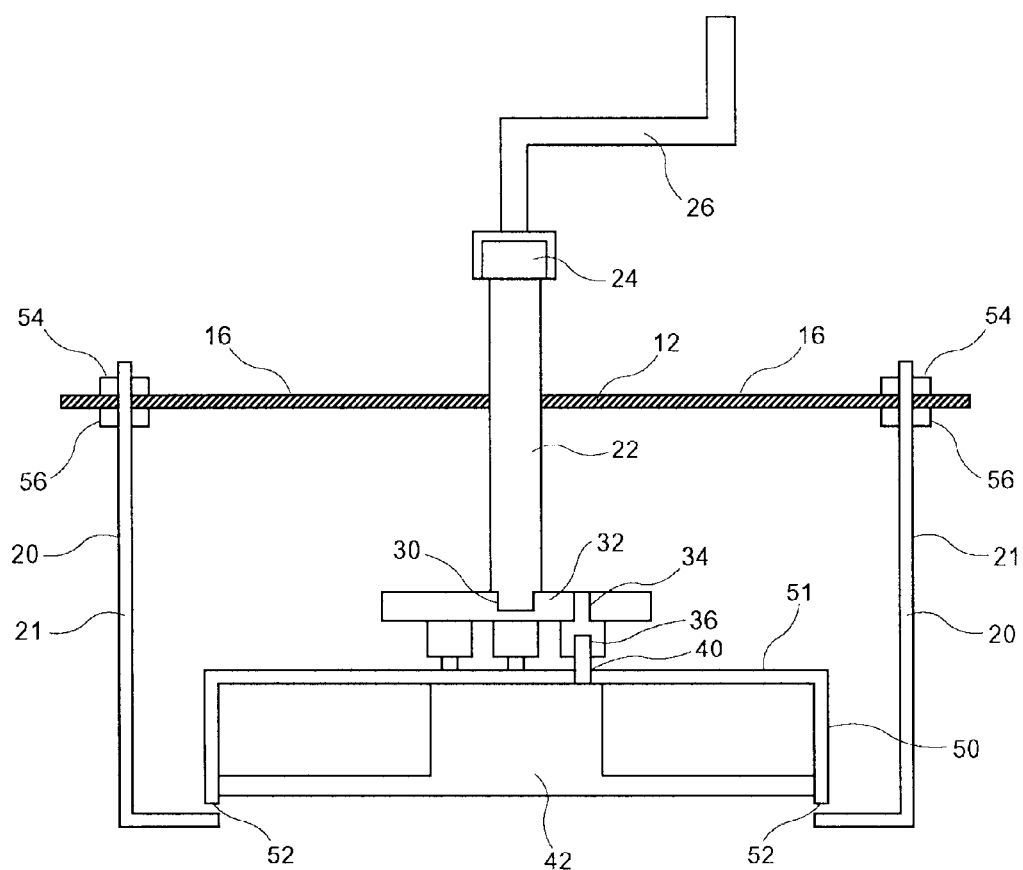
FIG. 2 is a side, cut-away view of a wheel pulling apparatus according to the present invention being used to remove a brake drum.

FIG. 2 shows the use of the device of FIG. 1 to remove a brake drum 50 from a wheel hub 42. In use, the operator would insert socket pins 36 over the wheel studs 40 which extend from wheel hub 42. Socket pins 36 can be threaded onto wheel studs 40, but might also have a sufficiently large opening to allow socket pins 36 to be merely inserted over wheel studs 40. Use of the socket pins 36 can be eliminated, but is generally preferred in order to minimize any damage to wheel studs 40.

For the purposes of the present document, the wheel hub 42 is generally defined as the area of the vehicle wheel in the general area of the vehicle axle. In the practice of the present invention, the force exerted on the wheel axle and/or hub is reduced since the push plate exerts a simultaneous force on the wheel studs. As such, the force exerted on the wheel hub is minimized, or at least evenly spread over the entire wheel hub.

Once socket pins 36 are in place, push plate 32 is attached so that the tapered ends of socket pins 36 extend through push plate holes 34. Preferably the fit of pins 36 in push plate 32 is sufficiently tight to hold pins 36 and push plate 34 together with the larger section of pins 36 being in contact with push plate 32. Holes 34 do not need to extend through push plate 32, but might merely be recesses in push plate 32.

One end of pilot shaft 22 is inserted into the recess 30 in push plate 32. The "hooked" end of hooks 20 are then brought into contact with the back edge 52 of brake drum 50. Details of the braking system are outside of the scope of this invention, and are not shown in the figures. The other ends of hooks 20 are fed through slots 18 in radial arms 16 of pull plate 12. The hooks can then be bolted into place using bolts 54 and 56. The hooks are preferably placed on radial arms 16 so that the shaft area 21 of hooks 20 is essentially perpendicular to the front surface 51 of brake drum 50 (or said brake rotor or wheel rim, as applicable).

Once all of the hooks 20 are in place, the end of crank 26 is fitted over the bolt-shaped end 24 of pilot shaft 22. The crank 26 is then turned.

As the crank 26 is turned, pilot shaft 22 attempts to move through pull plate 12. As a result of this motion, a pushing force is exerted onto push plate 32, which in turn, acts to exert a pushing force onto wheel studs 40 through socket pins 36. At the same time, a pulling force is exerted onto pull plate 12 which acts to exert a pulling force onto brake drum 50 through hooks 20 which are attached to the radial arms 16 of pull plate 12.

The combination of pushing force on the wheel studs, and the pulling force on the brake drum, act to free the seized brake drum from the wheel hub. It should be noted, that generally only a very small movement of brake drum 50 is required using the device of the present invention, since once the brake drum has been freed from the wheel hub, it can then be removed by hand.

Figure 3:
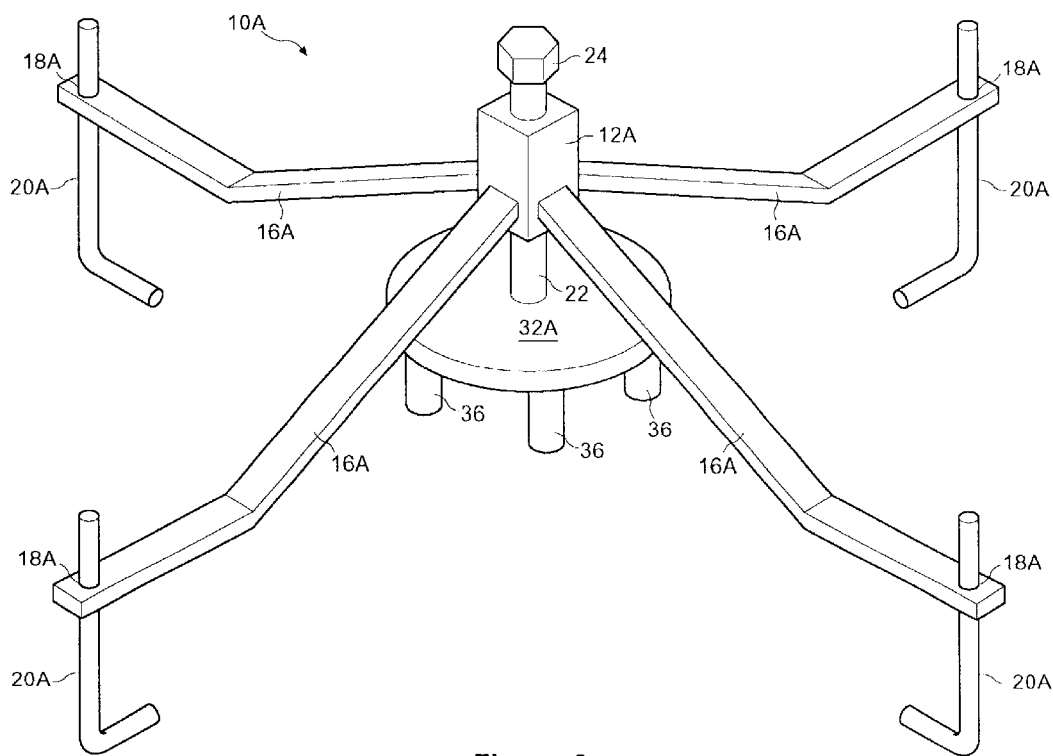
FIG. 3 is a perspective view of an alternative design of a wheel pulling apparatus according to the present invention.

In FIG. 3, a alternative design 10A for a wheel pulling apparatus of the present invention is shown having many of the same parts as in the wheel pulling apparatus of FIG. 1. However, in this embodiment, only 4 radial arms 16A are used, and arms 16A are bent so as to reduce the length of hooks 20A.

Also, in this design, the holes (not shown) in push plate 32A are merely recesses in push plate 32A and do not extend through push plate 32A. It should also be noted, however, that socket pins 36 may be permanently attached to push plate 32A if the device is commonly used for one standard wheel stud configuration.

Also, in this embodiment, it should be noted that the slots 18 in radial arms 16A have been eliminated in favour of pre-set holes 18A in radial arm 16A. Again, this might be preferred in situations where a standard wheel configuration is commonly used.

Figure 4:
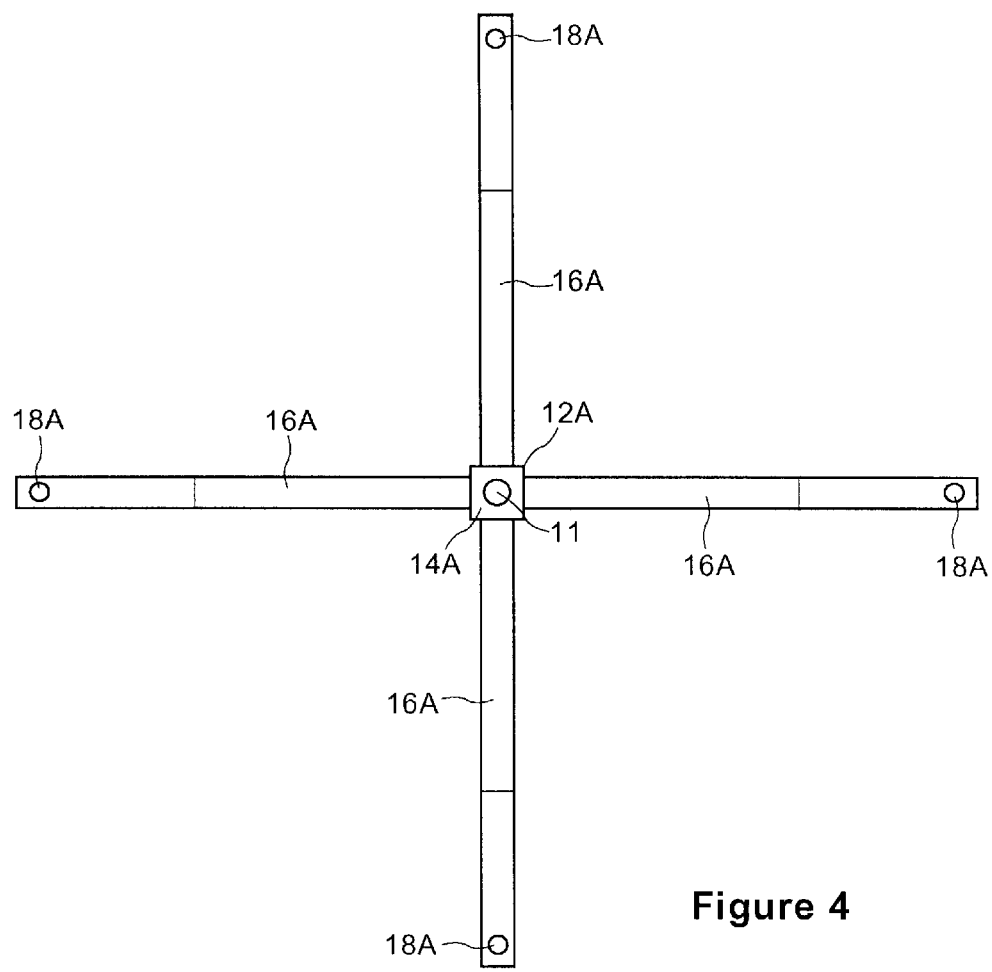
FIG. 4 is a top plan view of the pull plate of the wheel pulling apparatus of FIG. 3.

A top plane view of the pull plate 12A of the device of FIG. 3 is shown in FIG. 4. It can be seen that the central portion of 14A of pull plate 12A is generally quite small and merely includes a small plate around a threaded, central hole 11 through which pilot shaft 22 is inserted.

It should be noted, however, that numerous designs can be used in the production of pull plate 12, including a solid circular plate which contains holes for hooks 20 in appropriate locations, slots for hooks 20, or the like. The key requirements for the pull plate, however, are that the pull plate have holes, preferably at or near the centre of the plate, through which the pilot shaft can be threaded, and hook attachment points where a plurality of hooks can be permanently or releasably attached.

Figure 5:
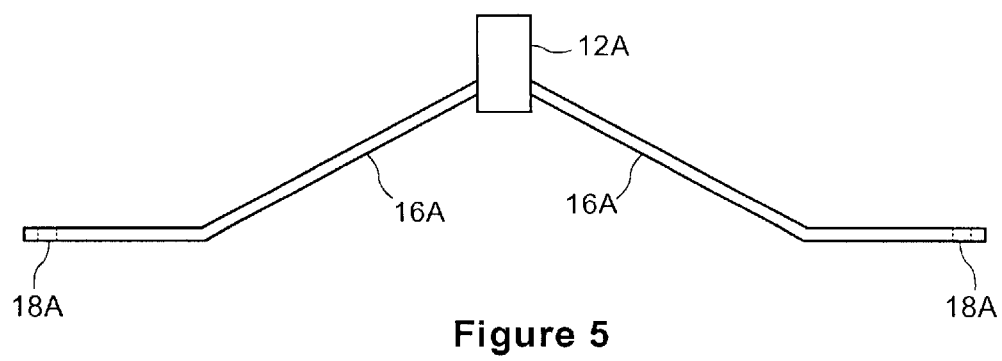
FIG. 5 is a side plan view of the pull plate of the wheel pulling apparatus of FIG. 3.

In FIG. 5, a side plane view of the pull plate of FIG. 4 is shown, which provides more detail on the construction of the wheel pulling apparatus.

Figure 6:
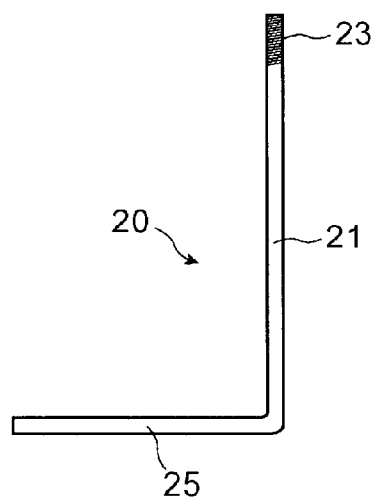
FIG. 6 is a side plan view of a hook of the wheel pulling apparatus of FIG. 3.

In FIG. 6, a side plane view of a hook 20 of use in the present invention is shown. Hook 20 has a shaft section 21, and preferably a threaded section 23 at one end of the shaft section 21 in order that the hook 20 can be bolted to radial arms 16. The "hook" section 25, may merely be a circular metal piece bent to 90 degrees from shaft section 21.

Figure 7:
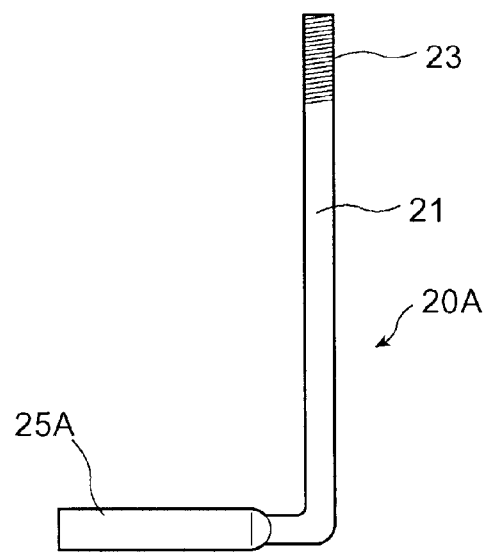
FIG. 7 is a side plan view of an alternative hook design.

In FIG. 7, an alternative design for hook 20 is shown, and is designated as 20A. For removal of some types of brake rotors, the hook shown in FIG. 5 would be acceptable. In some brake disk designs, both the front and back surfaces of the rotor are smooth for the brake pad to act against. Further, in order to aid in cooling of the rotor, some are built with open areas extending from the outer perimeter of the rotor into the rotor, between the rotor front and back surfaces. The hook 20A of FIG. 7 has a shaft section 21 and treaded section 23 identical to the hook of FIG. 5. However, the hook section 25A, is flattened along its surface to facilitate insertion of the "hook" into the brake rotor.

Hooks 20A of this design may be used in this application, as well as a variety of other applications.

Figure 8:
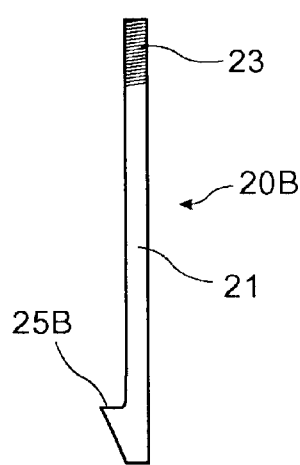
FIG. 8 is a side plane view of a further alternative hook design.

In FIG. 8, a further side plan view of an additional hook design, designated as 20B, is shown. In this design, hook section 25B is merely the "shoulder" of shaft section 21. This hook design would be of use in removal of a brake drum, having a relatively thin casing.

Figure 9:
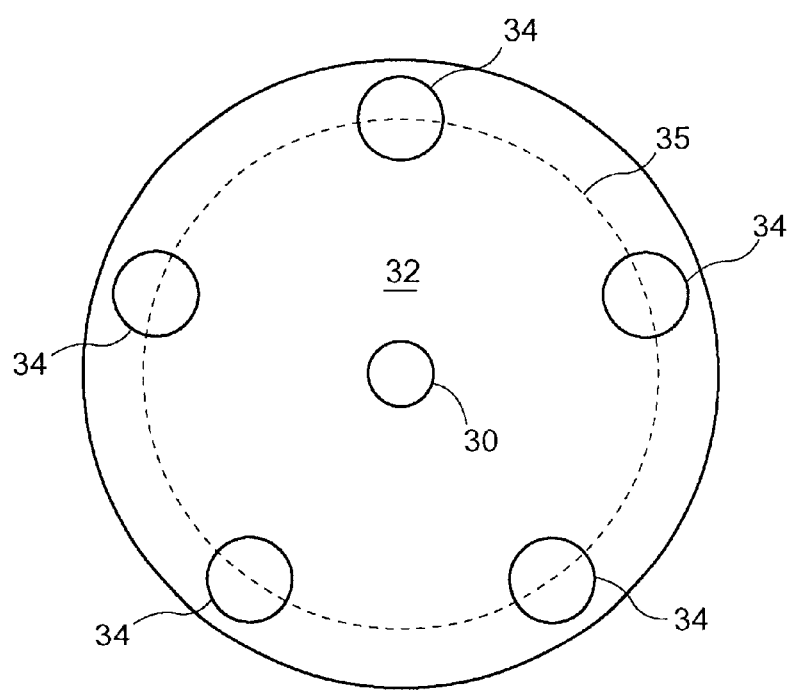
FIG. 9 is a top plan view of the push plate of the wheel pulling apparatus of FIG. 1.

In FIG. 9, a top plan view of the push plate 32 of FIG. 1 is shown. Push plate 32 has 5 holes 34 equally spaced around the push plate. Each hole 34 is located at an equal distance from the centre of the push plate 32, as indicated by line 35, and are placed so as to correspond to the spacing of the vehicle wheel studs. Holes 34 are adapted to receive the socket pins 36, as hereinabove described. Recess 30 in the top surface of push plate 32 is preferably centred in the middle of push plate 32, and is adapted to receive the end of pilot shaft 22.

Figure 10:
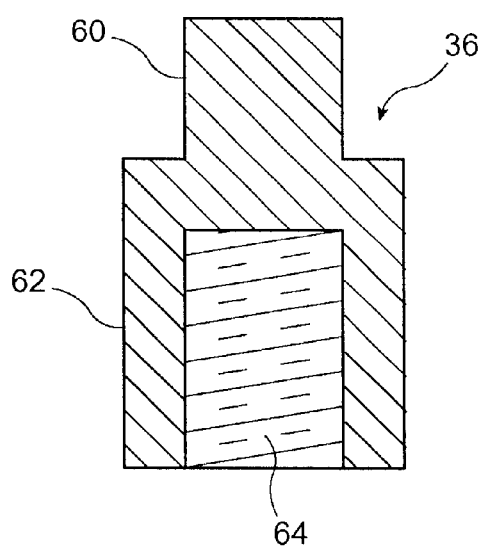
FIG. 10 is a cut-away side view of the socket pin of the wheel pulling apparatus of FIG. 1

FIG. 10 shows a cut-away view of a socket pin 36 of use in the practice of the present invention. Socket pins 36, in the embodiment shown in FIG. 1, comprise 2 main sections, namely, a tapered, smaller diameter section 60, for insertion into push plate 32, and a larger diameter section 62 for fitting over the end of the wheel studs. Socket pin 36 in this embodiment is threaded on the internal section 64 of larger diameter section 62 so that the socket pin 36 can by threaded onto the wheel stud.

Thus, it is apparent that there has been provided, in accordance with the present invention, a wheel pulling apparatus which fully satisfies the means, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

I claim:

1. A wheel pulling apparatus comprising:
    a. a push plate adapted to be placed in operative contact with a plurality of wheel studs;
    b. a pull plate having two or more hook attachment points;
    c. two or more hook members adapted to be attached, at a first end, to said pull plate at said hook attachment points, and which hook members are adapted to connect, at a hook end, to a wheel rim, a brake drum or a brake rotor;
    d. a threaded pilot shaft which threads through a threaded opening in said pull plate, and abuts, at a proximate end, against said push plate wherein said push plate has a central recess on one surface for receiving one end of the pilot shaft and which pilot shaft has, at a distal end, a turning mechanism for turning said threaded pilot shaft within the threaded opening in said pull plate; and
    e. a plurality of socket pins adapted to being attached to said plurality of wheel studs, wherein said socket pins are in contact with said push plate, so that said push plate exerts a simultaneous pushing force against said socket pins, and thus on said wheel studs, and said pull plate exerts a pulling force on said wheel rim, brake drum or brake rotor, through said hook members.

2. A wheel pulling apparatus as claimed in claim 1 wherein said wheel studs are the bolt ends which extend from the wheel hub on which the wheel, brake rotor, or brake drum, are mounted.

3. A wheel pulling apparatus as claimed in claim 1 wherein the number of wheel studs per wheel is between 3 and 8.

4. A wheel pulling apparatus as claimed in claim 3 wherein the number of wheel studs per wheel is between 4 and 6.

5. A wheel pulling apparatus as claimed in claim 1 wherein said push plate comprises a number of holes or recesses on a second surface into which the wheel studs of the socket pins can be inserted.

6. A wheel pulling apparatus as claimed in claim 5 wherein the number of holes or recesses match the number of wheel studs or the socket pins.

7. A wheel pulling apparatus as claimed in claim 1 wherein said turning mechanism comprises a bolt shaped head on said pilot shaft onto which a wrench or a wrench-shaped crank can be attached.

8. A wheel pulling apparatus as claimed in claim 7 wherein said turning mechanism comprises a crank shaped distal end.

9. A wheel pulling apparatus comprising:
    a. a push plate adapted to be placed in operative contact with a plurality of wheel studs;
    b. a pull plate having two or more hook attachment points;
    c. two or more hook members adapted to be attached, at a first end, to said pull plate at said hook attachment points, and which hook members are adapted to connect, at a hook end, to a wheel rim, a brake drum or a brake rotor; and
    d. a threaded pilot shaft which threads through a threaded opening in said pull plate, and abuts, at a proximate end, against said push plate, and which pilot shaft has, at a distal end, a turning mechanism for turning said threaded pilot shaft within the threaded opening in said pull plate, so that said push plate exerts a pushing force on said wheel studs, and said pull plate exerts a pulling force on said wheel rim, brake drum or brake rotor, through said hook members,
    wherein said hook members are attached to the pull plate at a hook attachment point using one or more bolts at a threaded end of the hook.

10. A wheel pulling apparatus as claimed in claim 9 wherein between 3 and 8 hook members are used.

11. A wheel pulling apparatus as claimed in claim 9 wherein between 4 and 6 hook members are used.

12. A wheel pulling apparatus comprising:
a. a push plate adapted to be placed in operative contact with a plurality of wheel studs;
b. a pull plate having two or more hook attachment points;
c. two or more hook members adapted to be attached, at a first end, to said pull plate at said hook attachment points, and which hook members are adapted to connect, at a hook end, to a wheel rim, a brake drum or a brake rotor; and
d. a threaded pilot shaft which threads through a threaded opening in said pull plate, and abuts, at a proximate end, against said push plate, and which pilot shaft has, at a distal end, a turning mechanism for turning said threaded pilot shaft within the threaded opening in said pull plate, so that said push plate exerts a pushing force on said wheel studs, and said pull plate exerts a pulling force on said wheel rim, brake drum or brake rotor, through said hook members, wherein said hook attachment points are threaded holes into which a threaded end of said hook member is tightened.

13. A wheel pulling apparatus comprising:
a. a push plate adapted to be placed in operative contact with a plurality of wheel studs;
b. a pull plate having two or more hook attachment points;
c. two or more hook members adapted to be attached, at a first end, to said pull plate at said hook attachment points, and which hook members are adapted to connect, at a hook end, to a wheel rim, a brake drum or a brake rotor; and
d. a threaded pilot shaft which threads through a threaded opening in said pull plate, and abuts, at a proximate end, against said push plate, and which pilot shaft has, at a distal end, a turning mechanism for turning said threaded pilot shaft within the threaded opening in said pull plate, so that said push plate exerts a pushing force on said wheel studs, and said pull plate exerts a pulling force on said wheel rim, brake drum or brake rotor, through said hook members, wherein said hook attachment points are holes through which a threaded end of said hook member is passed and then held in place by a bolt.

14. A wheel pulling apparatus comprising:
a. a push plate adapted to be placed in operative contact with a plurality of wheel studs;
b. a pull plate having two or more hook attachment points;
c. two or more hook members adapted to be attached, at a first end, to said pull plate at said hook attachment points, and which hook members are adapted to connect, at a hook end, to a wheel rim, a brake drum or a brake rotor; and
d. a threaded pilot shaft which threads through a threaded opening in said pull plate, and abuts, at a proximate end, against said push plate, and which pilot shaft has, at a distal end, a turning mechanism for turning said threaded pilot shaft within the threaded opening in said pull plate, so that said push plate exerts a pushing force on said wheel studs, and said pull plate exerts a pulling force on said wheel rim, brake drum or brake rotor, through said hook members, wherein said pull plate comprises a central portion having a threaded central hole for the pilot shaft to pass through, and a plurality of radial arms extending from the central portion, to which the hook members are attached, and wherein said plurality of radial arms each have a slot into which a threaded end of the hook member is inserted.

15. A wheel pulling apparatus as claimed in claim 14 wherein the number of said radial arms is between 3 and 8.

16. A wheel pulling apparatus as claimed in claim 15 wherein the number of said radial arms is between 4 and 6.

17. A wheel pulling apparatus as claimed in claim 14 wherein said hook member comprises a shaft area, and said hook member is attached to said pull plate so that said shaft area is perpendicular to said brake drum, brake rotor or said wheel rim.

18. A wheel pulling apparatus comprising:
a. a push plate adapted to be placed in operative contact with a plurality of wheel studs;
b. a pull plate having two or more hook attachment points;
c. two or more hook members adapted to be attached, at a first end, to said pull plate at said hook attachment points, and which hook members are adapted to connect, at a hook end, to a wheel rim, a brake drum or a brake rotor; and
d. a threaded pilot shaft which threads through a threaded opening in said pull plate, and abuts, at a proximate end, against said push plate, and which pilot shaft has, at a distal end, a turning mechanism for turning said threaded pilot shaft within the threaded opening in said pull plate, so that said push plate exerts a pushing force on said wheel studs, and said pull plate exerts a pulling force on said wheel rim, brake drum or brake rotor, through said hook members, wherein said pull plate comprises a central portion having a threaded central hole for the pilot shaft to pass through, and a plurality of radial arms extending from the central portion, to which the hook members are attached, and wherein said radial arms are bent towards said wheel rim, brake rotor or brake drum.

19. A wheel pulling apparatus comprising:
a. a push plate adapted to be placed in operative contact with a plurality of wheel studs;
b. a pull plate having two or more hook attachment points;
c. two or more hook members adapted to be attached, at a first end, to said pull plate at said hook attachment points, and which hook members are adapted to connect, at a hook end, to a wheel rim, a brake drum or a brake rotor;
d. a threaded pilot shaft which threads through a threaded opening in said pull plate, and abuts, at a proximate end, against said push plate, and which pilot shaft has, at a distal end, a turning mechanism for turning said threaded pilot shaft within the threaded opening in said pull plate, so that said push plate exerts a pushing force on said wheel studs, and said pull plate exerts a pulling force on said wheel rim, brake drum or brake rotor, through said hook members; and
e. a plurality of socket pins adapted to being attached to said plurality of wheel studs, wherein said socket pins are in contact with said push plate, and are threaded so that said socket pin can be threaded onto said wheel stud.

* * * * *